United States Patent [19]

Liu

[11] Patent Number: 6,079,020
[45] Date of Patent: Jun. 20, 2000

[54] METHOD AND APPARATUS FOR MANAGING A VIRTUAL PRIVATE NETWORK

[75] Inventor: Quentin C. Liu, Cupertino, Calif.

[73] Assignee: VPNet Technologies, Inc., Milpitas, Calif.

[21] Appl. No.: 09/013,743

[22] Filed: Jan. 27, 1998

[51] Int. Cl.[7] .................................................. G06F 11/30
[52] U.S. Cl. .......................................... 713/201; 709/223
[58] Field of Search .................................. 713/200, 201; 709/220–226

[56] References Cited

U.S. PATENT DOCUMENTS

| | | | |
|---|---|---|---|
| 5,339,356 | 8/1994 | Ishii | 379/234 |
| 5,432,783 | 7/1995 | Ahmed et al. | 370/60.1 |
| 5,490,212 | 2/1996 | Lautenschlager | 379/225 |
| 5,504,921 | 4/1996 | Dev et al. | 395/800 |
| 5,550,816 | 8/1996 | Hardwick et al. | 370/60 |
| 5,623,601 | 4/1997 | Vu | 395/187.01 |
| 5,659,542 | 8/1997 | Bell et al. | 370/496 |
| 5,742,762 | 4/1998 | Scholl et al. | 395/200.3 |
| 5,768,271 | 6/1998 | Seid et al. | 370/389 |
| 5,799,016 | 8/1998 | Onweller | 370/401 |
| 5,898,830 | 4/1999 | Wessinger, Jr. et al. | 395/187.01 |

*Primary Examiner*—Ayaz R. Sheikh
*Assistant Examiner*—Jigar Pancholi
*Attorney, Agent, or Firm*—Park & Vaughan LLP

[57] ABSTRACT

The present invention provides a method and an apparatus for managing a virtual private network operating over a public data network. This public data network has been augmented to include a plurality of virtual private network gateways so that communications across the virtual private network are channeled through the virtual private network gateways. One embodiment of the present invention includes a system that operates by receiving a command specifying an operation on the virtual private network. The system determines which virtual private network gateways are affected by the command. The system then automatically translates the command into configuration parameters for virtual private network gateways affected by the command. These configuration parameters specifying how the virtual private network gateways handle communications between specific groups of addresses on the public data network. The system then transmits the configuration parameters to the virtual private network gateways affected by the command, so that the virtual private network gateways are configured to implement the command.

22 Claims, 11 Drawing Sheets

| VPN GATEWAY OBJECT 600 | GROUP OBJECT 610 |
|---|---|
| - IP ADDRESS | - VPN GATEWAY ASSOCIATED WITH GROUP<br><br>- NETS / MASKS GROUP DEFINES |

| VPN OBJECT 620 | CLIENT OBJECT 630 |
|---|---|
| - LIST OF GROUPS<br><br>- LIST OF CLIENTS | - LISTING OF VPNs CLIENT BELONGS TO<br><br>- NSID / MKID |

FIG. 6

- ADD VPN
- ADD CLIENT
- GENERATE VPN KEY

- DELETE VPN
- DELETE CLIENT
- MODIFY VPN GATEWAY CONFIGURATION

- MODIFY VPN
- MODIFY CLIENT
- PING VPN GATEWAY

- ADD GROUP
- CREATE VPN GATEWAY
- PROXY PING

- DELETE GROUP
- DELETE VPN GATEWAY

- MODIFY GROUP
- MODIFY VPN GATEWAY

FIG. 7

METHOD AND APPARATUS FOR MANAGING A VIRTUAL PRIVATE NETWORK

BACKGROUND

1. Field of the Invention

The present invention relates to the field of data communication. More specifically, the present invention relates to techniques for managing secure virtual private networks over public or otherwise insecure data communication infrastructures.

2. Related Art

In recent years organizations have come to rely heavily on the ability to communicate data electronically between members of the organization. Such communications typically include electronic mail and file sharing or file transfer. In a centralized, single site organization, these communications are most commonly facilitated by a local area network (LAN) installed and operated by the enterprise.

Preventing unauthorized access to data traversing an enterprise's LAN is relatively straightforward. As long as intelligent network management is maintained, unauthorized accesses to data traversing an enterprise's internal LAN can be prevented. It is when the enterprise spans multiple sites that security threats from the outside become a considerable problem.

For distributed enterprises that want to communicate data electronically several options exist today; but each has associated disadvantages. The first option is to interconnect the offices or various sites with dedicated, or private, communication connections often referred to as leased lines. This is the traditional method that organizations use to implement a wide area network (WAN). The disadvantages of implementing an enterprise-owned and controlled WAN are obvious: they are expensive, cumbersome and frequently underutilized if they are configured to handle the peak capacity requirements of the enterprise. The obvious advantage is that the lines are dedicated for use by the enterprise and are therefore reasonably secure from eavesdropping or tampering by intermediate third parties.

An alternative to dedicated communication lines is for an enterprise to handle inter-site data distributions over the emerging public network space. In recent years, the Internet has evolved from being primarily a tool for scientists and academics into an efficient mechanism for global communications. The Internet provides electronic communications paths between millions of computers by interconnecting the various networks upon which those computers reside. It has become commonplace, even routine, for enterprises, even those in non-technical fields, to provide Internet access to at least some portion of the computers within the enterprises. For many businesses this facilitates communications with customers and potential business partners as well as to geographically distributed members of the organization.

Distributed enterprises have found that the Internet is a convenient mechanism for providing electronic communications between members of the enterprise. For example, two remote sites within an enterprise may each connect to the Internet through a local Internet Service Provider (ISP). This enables the various members of the enterprise to communicate with other sites on the Internet, including those within their own organization. A large disadvantage of using the Internet for intra-enterprise communications is that the Internet is a public network. The route by which data communication travel from point to point can vary on a per packet basis, and is essentially indeterminate. Furthermore, the data protocols for transmitting information over the constituent networks of the Internet are widely known, leaving electronic communications susceptible to interception and eavesdropping with packets being replicated at most intermediate hops. An even greater concern is the fact that communications can be modified in transit or even initiated by impostors. With these disconcerting risks, most enterprises are unwilling to subject their proprietary and confidential internal communications to the exposure of the public network space. For many organizations it is common today to not only have Internet access provided at each site, but also to maintain the existing dedicated communications paths for internal enterprise communications, with all of the attendant disadvantages described above.

To remedy this problem, organizations have begun to build "virtual private networks" (VPNs) on top of public networks, such as the Internet, to protect data transmitted over public networks. Virtual private network systems often rely on virtual private network gateways, which reside on the WAN side of a routing apparatus to connect an enterprise site to the Internet. Thus, VPN gateways are in the path of all relevant data traffic between an enterprise site and the public network. To ensure secure data communications between members of the same VPN group, a VPN gateway implements a combination of techniques for data communication between members of the VPN group. These techniques include various combinations of compression, encryption and authentication, the rules for each of which may vary for members of different groups.

Managing a large number of VPN gateways, which are geographically distributed throughout a public network, can be a time-consuming and error-prone task. Each time a VPN is modified, VPN gateways must be reconfigured to reflect the modifications. This reconfiguration can be performed remotely across the public network from a central site. Hence, it is not necessary to physically travel to the remote site. Nevertheless, this process is time-consuming because each VPN gateway must presently be reconfigured with network address information specifying which communications are to be transmitted securely, and which ones are not.

For example, a VPN administrator receives a policy to implement, such as modifying a VPN. The administrator determines which groups of network nodes, and which VPN gateways, are involved in the policy. The VPN administrator then manually determines for each VPN gateway, what type of configuration information must be transmitted to the VPN gateway to implement the policy. This configuration information typically includes network address information. Finally, the configuration information must be explicitly propagated to the VPN gateways.

A VPN administrator must presently enter this configuration information manually, which can be a time-consuming task. Furthermore, it is very easy to make mistakes in translating a policy into network address specifications, and in entering the long strings of number that make up network address specifications. Such mistakes can cause improper configuration of network gateways, thereby potentially creating a security hole. Additionally, this configuration information is typically transmitted insecurely over the public network to the VPN gateways. Hence, this information can potentially be intercepted by third parties listening in on network traffic.

What is needed is a system for managing VPN gateways in a VPN system that eliminates the time-consuming and error-prone task of manually reconfiguring VPN gateways to reflect changes to virtual private networks.

SUMMARY

The present invention provides a method and an apparatus for managing a virtual private network operating over a public data network. This public data network has been augmented to include a plurality of virtual private network gateways so that communications across the virtual private network are channeled through the virtual private network gateways. One embodiment of the present invention includes a system that operates by receiving a command specifying an operation on the virtual private network. The system determines which virtual private network gateways are affected by the command. The system then automatically translates the command into configuration parameters for virtual private network gateways affected by the command. These configuration parameters specifying how the virtual private network gateways handle communications between specific groups of addresses on the public data network. The system then transmits the configuration parameters to the virtual private network gateways affected by the command, so that the virtual private network gateways are configured to implement the command.

In one embodiment of the present invention, the system receives the configuration parameters at the VPN gateway. The system uses these configuration parameters to determine whether the source and destination addresses of a communication between nodes in the public data network belong to the same virtual private network. If the source and destination addresses belong to the same virtual private network, the system ensures that the communication is transmitted securely over the public data network.

In one embodiment of the present invention, the VPN gateways are managed by a central VPN management station coupled to the public data network.

One embodiment of the present invention includes a number of different VPN management commands, including commands to create a VPN, to modify a VPN and to delete a VPN.

In one embodiment of the present invention, the configuration parameters include specific groups of addresses between which communications are to be transmitted securely. In a variation on this embodiment, the configuration parameters include Internet Protocol (IP) addresses.

In another embodiment of the present invention, translating the command into configuration parameters includes aggregating address specifications for groups of nodes involved in the command. It also includes creating configuration parameters by determining, for each virtual private network gateway affected by the command, which address specifications specify local addresses on the local network, and which address specifications specify non-local addresses.

In a variation on some of the above embodiments, the configuration parameters are transmitted securely over the public data network to the VPN gateways.

In another embodiment of the present invention, a database is updated to reflect changes on the VPN.

In another embodiment of the present invention, the VPN gateways handle communications between remote clients coupled to the public data network through an internet service provider (ISP).

DESCRIPTION OF THE FIGURES

FIG. 6 is a diagram of some of the data objects operated on by high-level commands in accordance with an embodiment of the present invention.

FIG. 7 is a listing of some of the operations specified by high-level commands and performed on the data objects illustrated in FIG. 6 in accordance with an embodiment of the present invention.

DEFINITIONS

Figure 1:
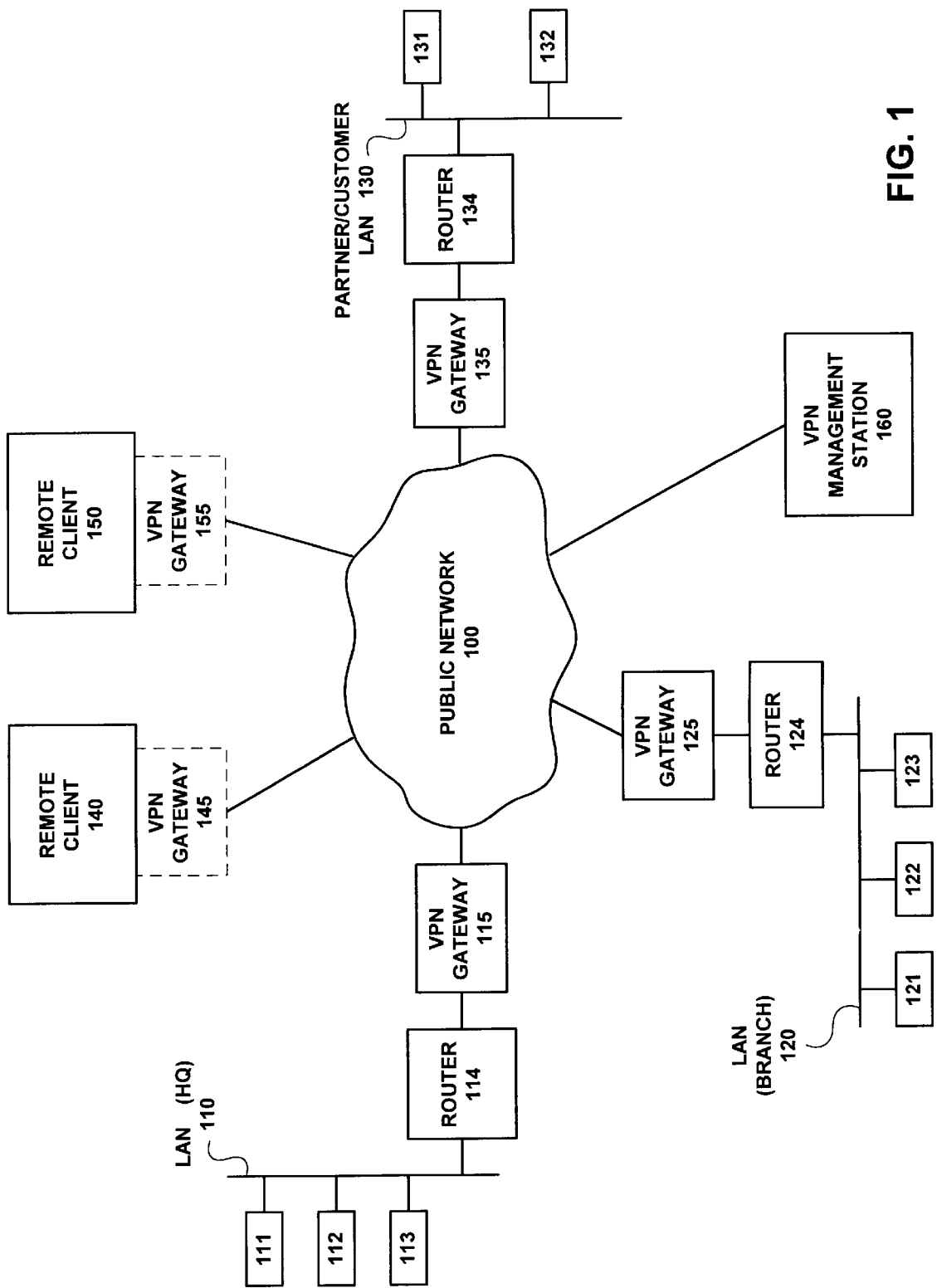
FIG. 1 illustrates a public network 100 including VPN gateways 115, 125, 135, 145, and 155 operating under control of a VPN management station 160 in accordance with an embodiment of the present invention.

Configuration Parameters—parameters sent to a VPN gateway to configure the VPN gateway to appropriately handle communications between members of VPNs.

Group of Nodes—a group of nodes on a public network. In one variation, these nodes belong to the same local network. In another variation, these nodes are specified by at least one net/mask pair.

Local Address—an address on the same enterprise network (or local network), wherein the enterprise network is separated from a public data network by a VPN gateway.

Local Network—an enterprise network (or a local network) separated from a public data network by a VPN gateway.

Net/Mask Pair—a specification for a group of network addresses including a network ID and a network address mask.

Network Group—same as group of nodes.

Non-local Address—an address on a different enterprise network (or local network), wherein enterprise networks are separated from a public data network by a VPN gateway.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Although the present invention is described predominantly in terms of utilizing the Internet as a communications medium, the concepts and methods are broad enough to accomplish the implementation of secure virtual private networks over other public or insecure communications media. Throughout this detailed description, numerous specific details are set forth, such as particular encryption or key management protocols, in order to provide a thorough understanding of the present invention. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In many instances, components implemented by the present invention are described at an architectural, functional level. Many of the elements may be configured using well-known structures, particularly those designated as relating to various compression or encryption techniques. Additionally, for logic to be included within the system of the present invention, functionality and flow diagrams are described in such a manner that those of ordinary skill in the art will be able to implement the particular methods without undue experimentation. It should also be understood that the techniques of the present invention may be implemented using a variety of technologies. For example, the VPN gateway to be described further herein may be implemented in software running on a computer system, or implemented in hardware utilizing either a combination of microprocessors or other specially designed application specific integrated circuits, programmable logic devices, or various combinations thereof.

Description of Virtual Private Networks

FIG. 1 illustrates a public network 100 including VPN gateways 115, 125, 135, 145, and 155 operating under control of a VPN management station 160 in accordance with an embodiment of the present invention. Public network 100 may be any type of communication channel, including, but not limited to, data networks such as the Internet. VPN gateway 115 couples headquarters local area network (LAN) 110 to public network 100 through router 114. Headquarters LAN 110 is illustrated with three endstations 111, 112, and 113, respectively coupled to headquarters LAN 110. Likewise, VPN gateway 125 couples Branch LAN 120 to public network 100 through router 124. Branch LAN 120 is shown having a plurality of endstations 211, 212 and 213, respectively, coupled to branch LAN 120. VPN gateway 135 couples partner/customer LAN 130 to public network 100 through router 134. Partner/customer LAN 130 is illustrated in FIG. 1 as comprising of plurality of computers, 131 and 132, coupled to communicate data packets over the partner/customer LAN 130. The local area networks utilized for data communications within the headquarters, customer and branch sites may adhere to a wide variety of network protocols, the most common of which are Ethernet and Token Ring.

VPN gateways 145 and 155 couple remote clients 140 and 150, respectively, to public network 100. Remote clients are systems coupled to public network 100 from remote locations. It is frequently desirable for other members of the enterprise who may be on the road or working from home or other remote locations to exchange data with other members of the enterprise. Thus, remote clients 140 and 150 may communication with the headquarters LAN 110 over long distance telephone lines. Alternatively, remote clients 140 and 150 may have local access to public network 100 through local Internet service providers (ISPs). In one embodiment, VPN gateways 145 and 155 are implemented as hardware modules. In another embodiment, VPN gateways 145 and 155 are implemented as software modules within remote clients 140 and 150, respectively.

VPN management station 160 controls VPN gateways 115, 125, and 135 through commands and configuration information transmitted to VPN gateways 115, 125 and 135 through public network 100. VPN management station 160 may be implemented in software running on a computer system, or alternatively may be implemented in hardware utilizing either a combination of microprocessors or other specially designed application specific integrated circuits, programmable logic devices, or various combinations thereof. The structure of VPN management station 160 is described in more detail below with reference to FIGS. 4 and 5.

Each of the LANs for the particular sites illustrated in FIG. 1 ultimately connect to the public network 100 through associated routing or gateway devices, which are identified as routers 114, 124 and 134, respectively. Data packets conveyed between the various sites illustrated in FIG. 1 generally traverse a plurality of additional routing devices on their way between the source and destination sites for the packets. The mechanisms for data packet transfers over a public network 100, such as the Internet are well known and are not described in great detail herein. In one embodiment, packets are assembled in accordance with the Internet Protocol (IP) and are referred to herein as IP packets regardless of the version of the Internet protocol presently in effect.

The illustrated placement of VPN gateways in the overall system architecture represents only one placement choice. Other configurations are possible. The only requirement is that the VPN gateways reside in the path of data traffic. In another embodiment, the VPN gateway is located on the LAN side of a site's router. VPN gateways maintain lookup tables for identifying members of specific virtual private network groups.

When a data packet is sent between source and destination addresses that are both members of the same VPN group, the VPN gateway processes the data packet from the sending side ensuring that it is properly encrypted, authenticated and optionally compressed. Likewise, the receiving VPN gateway servicing the destination site will detect that a packet is being propagated between members of the same VPN group. The receiving VPN gateway decrypts and authenticates the packet before forwarding it toward the destination endstation. In this way, secure data communications between end users is achieved in a manner that is transparent to the end users. As described above, in the case of remote clients 140 and 150, VPN gateways 145 and 155 may be implemented in software, which operates in conjunction with the communication software for connecting the remote client to its associated Internet Service Provider (ISP).

Figure 2:
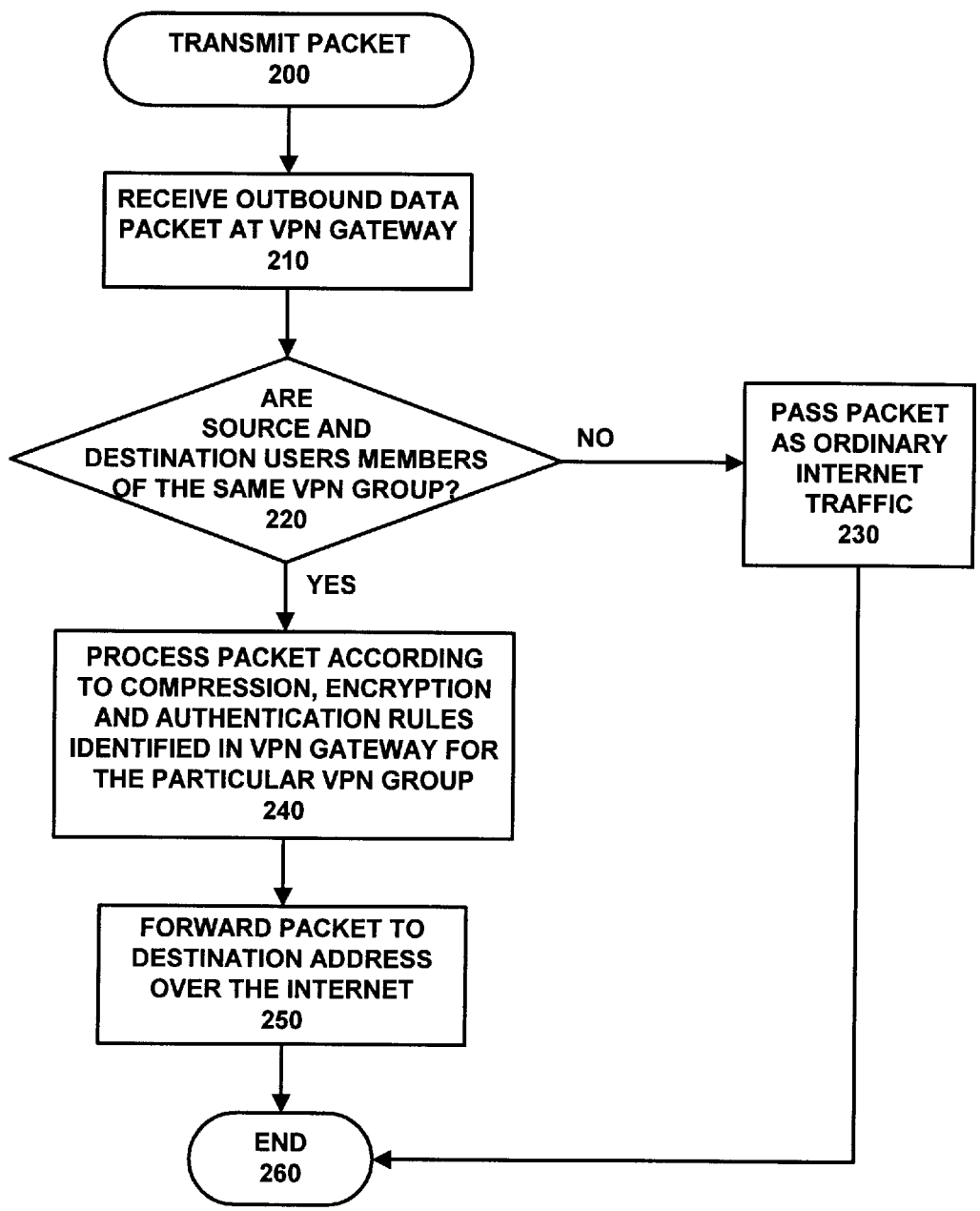
FIG. 2 is a flow chart illustrating the processing of a packet being transmitted from one member of a VPN to another member of the VPN over a public data network in accordance with an embodiment of the present invention.
Figure 3:
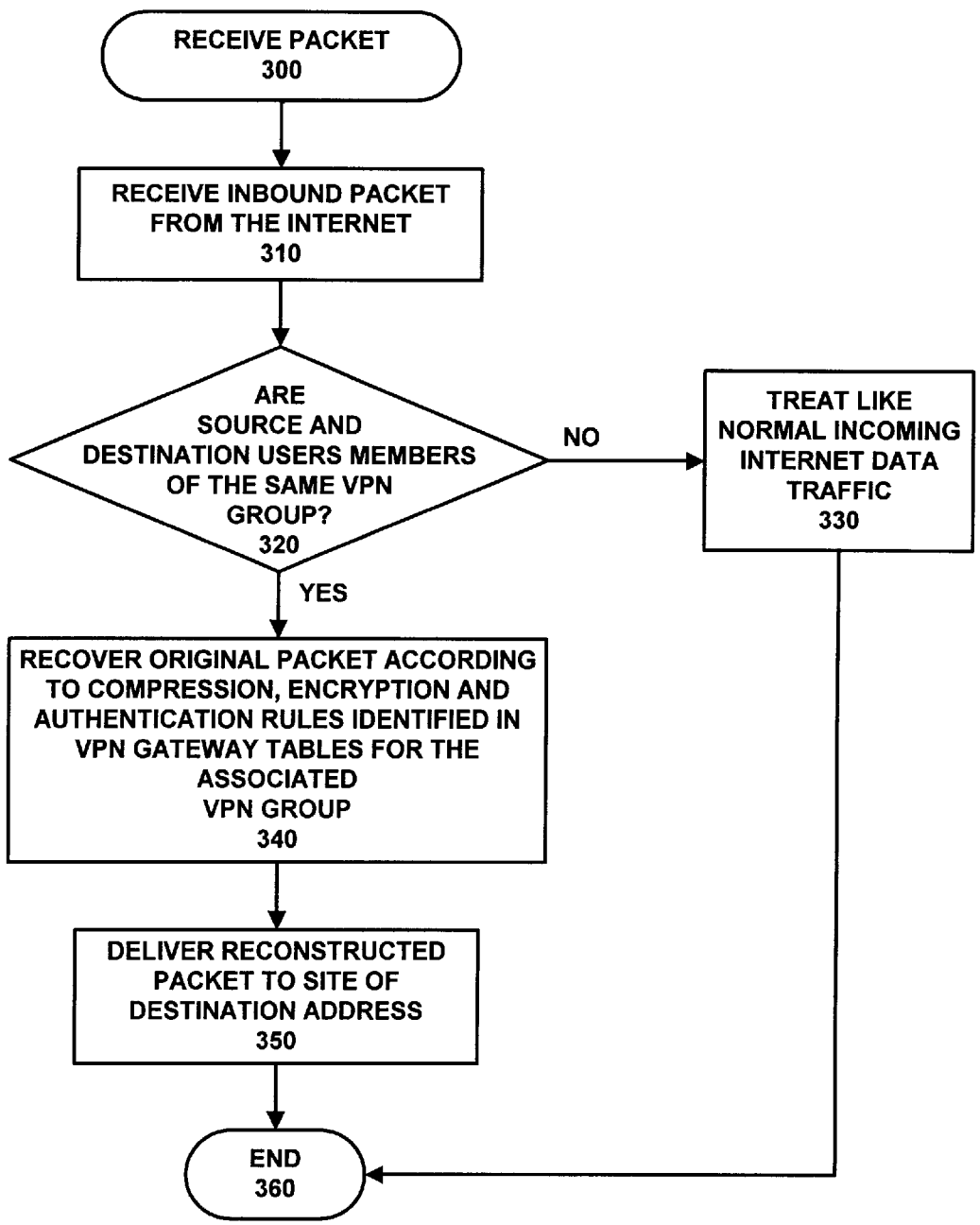
FIG. 3 is a flow chart illustrating the processing of a packet being received over a public data network by one member of a VPN from another member of the VPN in accordance with an embodiment of the present invention.

FIG. 2 is a flow chart illustrating the processing of a packet being transmitted from one member of a VPN to another member of the VPN over a public data network in accordance with an embodiment of the present invention. When a data packet originates from an endstation, such as endstation 112 of LAN 110, and it is destined for a remote site, outside of LAN 110, the packet is initially be treated as an ordinary Internet data packet. The packet proceeds from endstation 112 over LAN 110 to the routing device 114, which encapsulates the data packet in accordance with the Internet Protocol, forming an outbound IP packet. On its way out of the site, the IP packet passes through the associated VPN gateway 115 for the site. The flowchart illustrated at FIG. 3 shows how a VPN gateway processes an outbound packet. The transmit procedure 200 begins when the outbound data packet is received at the VPN gateway in state 210. At decision box 220, the system determines whether or not the source and destination addresses for the data packet are both members of the same VPN group. This determination may be made with reference to lookup tables that are maintained by the VPN gateways or by referencing to other memory mechanisms. This state may be thought of as member filtering for data packets being transmitted between the particular site and the VPN gateway which services it. If the source and destination address for the data packet are not both members of the same VPN group, then at state 230 the packet is forwarded to the Internet as ordinary Internet traffic from the site, as though the VPN gateway were not involved. In this case, the system proceeds to state 260, which is an end state. In an alternative embodiment, the system discards data traffic that is not between members of a VPN group rather than forwarding it as unsecure traffic. In another embodiment, the system provides the option to either pass or discard non-VPN group data traffic.

If, at decision box 220, the system determines that both the source and destination addresses for the data packet are members of the same VPN group, the data packet is processed at state 240 undergoing various combinations of compression, encryption and authentication. Lookup tables maintained by the VPN gateway 115 and all of the VPN units identify members of particular VPN groups. They additionally identify whether or not data packets transferred between members of the particular VPN group are to be compressed, and if so, what algorithm is used for compression. Many possible compression algorithms are well known, but in one embodiment of the invention, LZW compression is used. The lookup table for the VPN group, of which the source and destination addresses are members, also identifies the particular encryption algorithm used for data packets traversing the Internet for the VPN group. The lookup table additionally identifies the authentication and the key management protocol information which is used. As an alternative to lookup tables, the VPN gateway may be programmed to always use the same algorithms for all VPN groups.

The particular packet processing algorithms to be used for VPN traffic may vary, so long as the lookup tables in both the sending and receiving VPN units identify the same compression, encryption and authentication rules and are capable of implementing them for members of the same group.

Note that a single VPN gateway may serve multiple VPN groups, and that particular network addresses may be members of multiple groups. Thus, at state 240, when a packet is destined from one member of the VPN group to another, the packet is processed according to the compression, encryption and authentication rules identified in the VPN gateway tables for that particular VPN group. Then, at state 250, the processed packet is forwarded toward the destination address over the Internet. The sending procedure ends at state 260.

FIG. 3 is a flow chart illustrating the processing of a packet being received over a public data network by one member of a VPN from another member of the VPN in accordance with an embodiment of the present invention. This packet receiving procedure 300 begins at state 310 when an inbound data packet is received from the Internet at the receiving VPN gateway. At decision box 320, the inbound data packet is examined to determine if the source and destination addresses of the data packet are both members of the same VPN group. (It is assumed that the lookup tables maintained by all of the VPN units are both consistent and coherent.) If the inbound data packet is determined not to be VPN traffic, then the packet is passed through and forwarded to the receiving site as though it were normal Internet data traffic at state 330. The system then proceeds to state 360, which is an end state. In an alternative embodiment, the system discards incoming data traffic that is not from an identified member of a VPN group supported by the VPN gateway.

For data packets that are determined to be VPN traffic at decision box 320, the VPN gateway processes the inbound packet to recover the original data packet as it was provided from the source endstation. The lookup table maintained by the receiving VPN gateway identifies the compression, encryption and authentication rules used for the VPN group and reconstructs the original IP packet in accordance with those rules at state 340. Then, the reconstructed packet will be delivered to the site of the destination address at state 360. The system then proceeds to state 360, which is an end state.

Description of VPN Management Station

Figure 4:
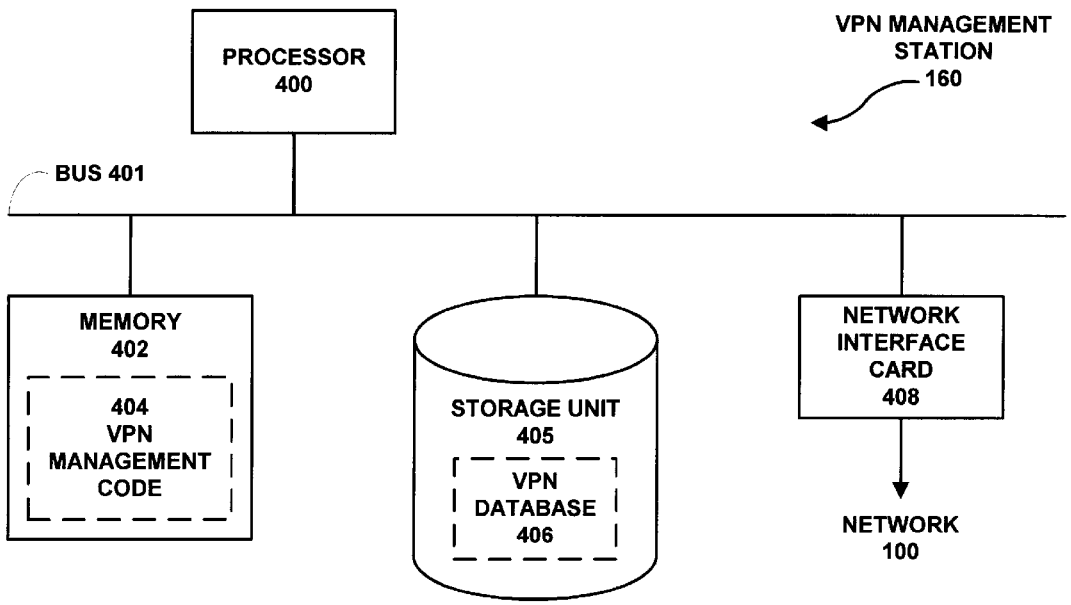
FIG. 4 is a block diagram illustrating part of the internal structure of VPN management station 160 in accordance with an embodiment of the present invention.

FIG. 4 is a block diagram illustrating part of the internal structure of VPN management station 160 in accordance with an embodiment of the present invention. In general, VPN management station 160 may be any type of computational system coupled to public network 100. In the embodiment illustrated in FIG. 4, VPN management station 160 includes processor 400 coupled to memory 402, storage unit 405 and network interface card 408 through bus 401. Memory 402 includes VPN management code 404, which contains instructions and data to manage VPN gateways coupled to network 100. Storage unit 405 includes database 406, which includes information reflecting the structure of virtual private networks supported by the system as well as the configuration of the VPN gateways supported by VPN management station 160. Network interface card 408 couples VPN management station 160 to network 100. The operations performed by VPN management station 160 are discussed in more detail below.

Figure 5:
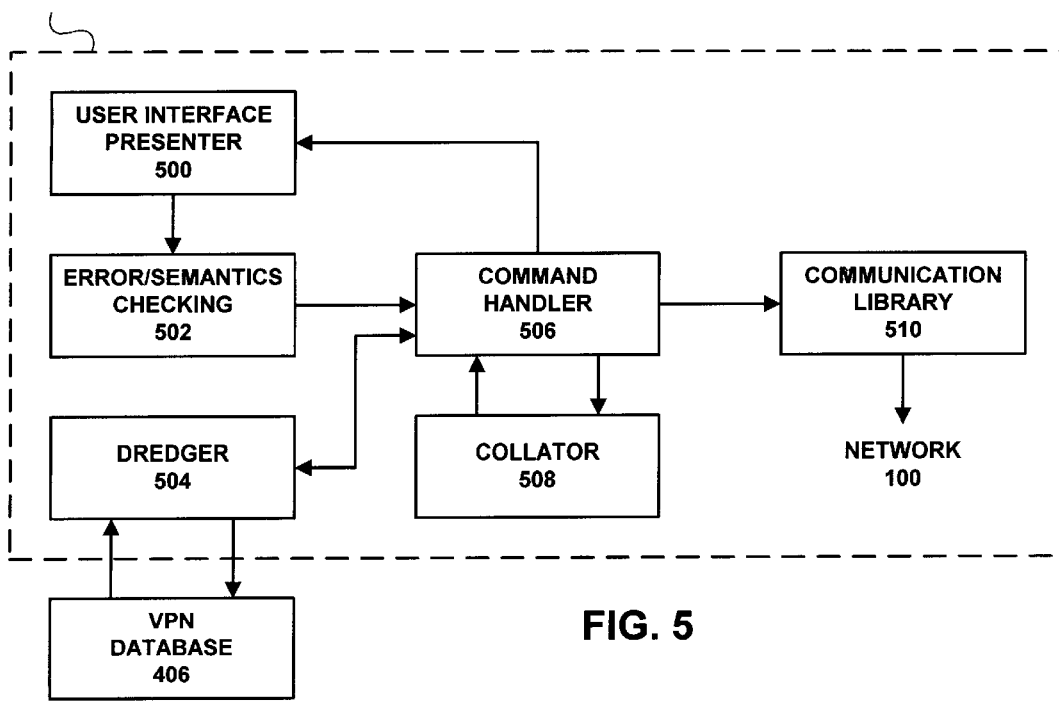
FIG. 5 is a block diagram of part of the software architecture contained within VPN management station 160 in accordance with an embodiment of the present invention.

FIG. 5 is a block diagram of part of the software architecture contained within VPN management station 160 in accordance with an embodiment of the present invention. As noted above, VPN management station 160 includes VPN management code 404 in memory 402 and VPN database 406 on storage unit 405. VPN management code 404 includes user interface presenter 500, which receives input from a system user. This input feeds through error/semantics checking module 502 before feeding into command handler 506. Command handler 506 is coupled to dredger 504, collator 508 and communication library 510. Command handler 506 executes the commands received through user interface presenter 500 by manipulating dredger 504, collator 508 and communication library 510. Dredger 504 is coupled to and performs searches through and performs updates to VPN database 406. Communication library 510 contains functions to communicate with network 100. Collator 508 sorts and manipulates network addresses to produce configuration information for VPN gateways.

During operation, the system outlined in FIG. 5 operates as follows. A system user inputs a command into user interface presenter 500. This command feeds through error/semantics checker module 502 before arriving at command handler 506. Command handler 506 may present additional screens or queries to the user through user interface presenter 500. Command handler then retrieves information regarding the groups of nodes, VPNs and VPN gateways affected by the command. Command handler 506 takes this information and uses it to produce configuration information for VPN gateways using collator 508. This configuration information is communicated to the VPN gateways using functions from communication library 510, which communicate across network 100.

Description of High Level Objects and Operations

FIG. 6 is a diagram of some of the data objects operated on by high-level commands in accordance with an embodiment of the present invention. FIG. 6 includes VPN gateway object 600, group object 610, VPN object 620 and client object 630. A user manipulating VPN management station 160 specifies sequences of operations on the above-listed objects. Hence, the user does not have to directly manipulate lower level addressing information to configure VPN gateways. This lower level addressing information is automatically generated by VPN management station 160 and sent to the VPN gateways. A VPN gateway object 600 is created for each VPN gateway in the network. A VPN gateway object comprises a number of parameters including the Internet Protocol (IP) address of the VPN gateway. A group object 610 is created for groups of network nodes on public network 100. In this embodiment, a group object includes an identifier for the VPN gateway associated with the group and the net/mask pairs the group defines. A VPN object 620 is created for each virtual private network supported by VPN management station 160. A VPN object 620 comprises a number of attributes including a list of groups and a list of remote clients included in the underlying VPN. A client object 630 is created for each remote client supported by VPN management station 160. A client object comprises a number of attributes including a listing of the virtual private networks the client belongs to and the NSID/MKID identifier for the remote client. In one embodiment, the NSID, or name space ID is the MD5 hash of a user name, and the MKID is the master key ID of the domain. These serve to identify the remote client.

FIG. 7 is a listing of some of the operations performed on the data objects illustrated in FIG. 6 in accordance with an embodiment of the present invention. In this embodiment, the system includes operations to add, modify and delete the four objects illustrated in FIG. 6. This embodiment also includes operations to generate a VPN key for security purposes and an operation to explicitly modify a VPN configuration. The embodiment additionally includes an operation to "ping" and VPN gateway to ensure that both the communication link to the VPN gateway and the VPN gateway are functioning. The embodiment additionally includes a "proxy ping" command, which causes a VPN gateway to ping a node on the network.

Examples of Operations

Figure 8:
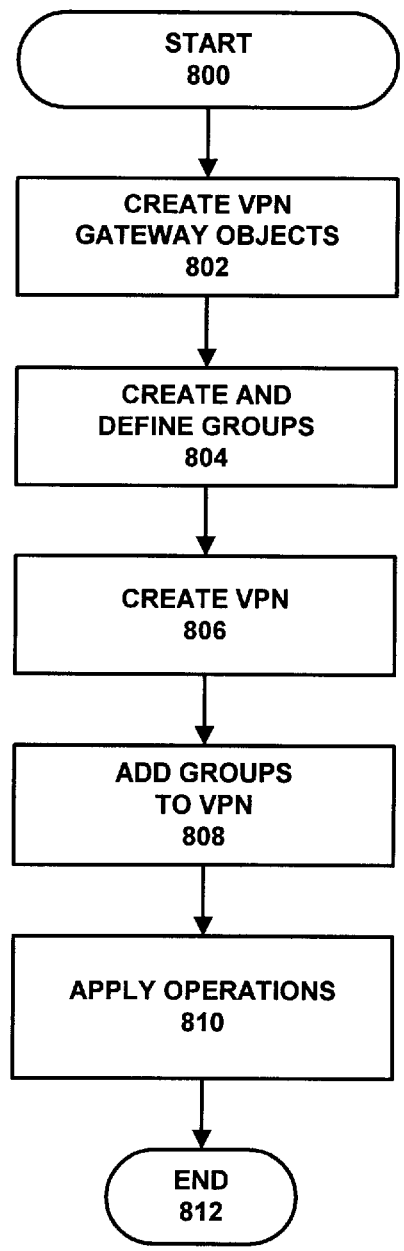
FIG. 8 is a flow chart illustrating some of the operations performed by a VPN system manager to create a VPN in accordance with an embodiment of the present invention.

FIG. 8 is a flow chart illustrating some of the operations performed by a VPN system manager to create a VPN in accordance with an embodiment of the present invention. The system manager starts a state 800 and proceeds to state 802. In state 802, the system manager issues commands to create VPN gateway objects corresponding to physical VPN gateways on network 100. The system manager then proceeds to state 804. In state 804, the system manager issues commands to create and define groups of network nodes. The system manager then proceeds to state 806, in which the system manager issues a command to create a VPN object. The system manager then proceeds to state 808. In state 808, the system manager adds groups to the VPN. The system manager then proceeds to state 810, in which the system manager issues a command to apply the previous operations. The system manager's work is complete at this point, and the software in VPN management station 160 takes over as is described in more detail below. The system manager then proceeds to state 812, which is an end state.

Figure 9:
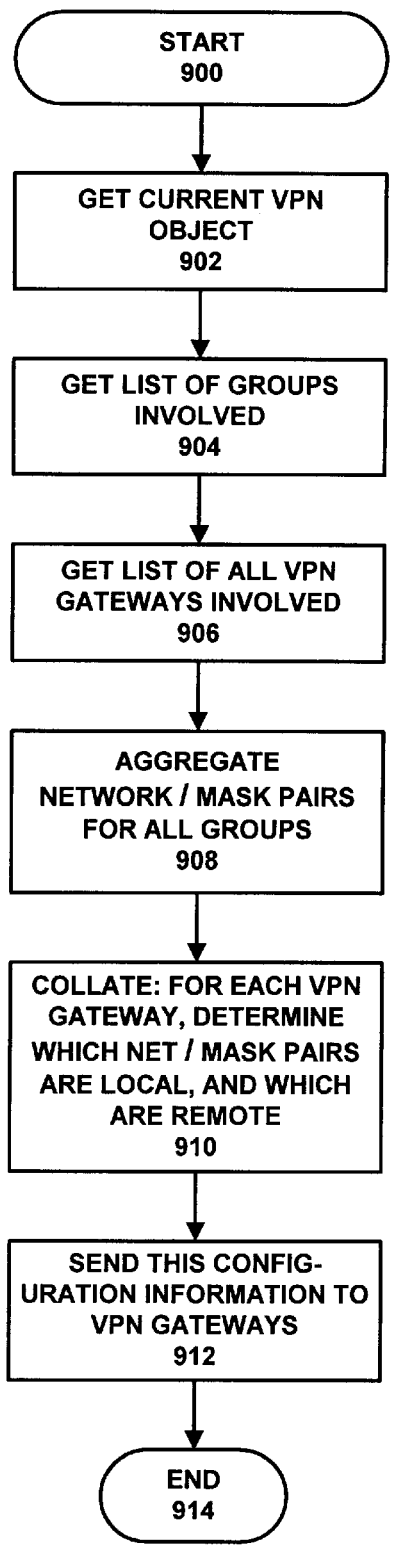
FIG. 9 is a flow chart illustrating some of the operations performed by VPN management station 160 in order to create a VPN in accordance with an embodiment of the present invention.

FIG. 9 is a flow chart illustrating some of the operations performed by VPN management station 160 in order to create a VPN in accordance with an embodiment of the present invention. In one embodiment, these operations are performed by VPN management code 404 in VPN management station 160. The system starts in state 900 and proceeds to state 902. In state 902, the system gets the current VPN object, which is the subject of the VPN creation command. The system the proceeds to state 904. In state 904, the system gets a list of groups involved in the command, in other words the groups to be included in the VPN. The system then proceeds to state 906. In state 906, the system gets a list of all VPN gateways involved in the command by examining the appropriate fields in the VPN group objects. The system then proceeds to state 908. In state 908, the system aggregates network/mask pairs for all groups involved in the operations. Network mask pairs specify networks and address masks to specify a group. The system then proceeds to state 910. In state 910, the system performs a collation operation to create configuration information for the VPN gateways. This involves the following. For each VPN gateway, the system determines which net/mask pairs are on the local enterprise network or LAN and which net/mask pairs are remote. This configuration information allows each VPN gateway to determine which communications are to be encrypted, and which communications are not to be encrypted. The system then proceeds to state 912. In state 912, the system sends the configuration to the appropriate VPN gateways so that the VPN gateways can be configured to implement the VPN. The system then proceeds to state 914, which is an end state.

Figure 10:
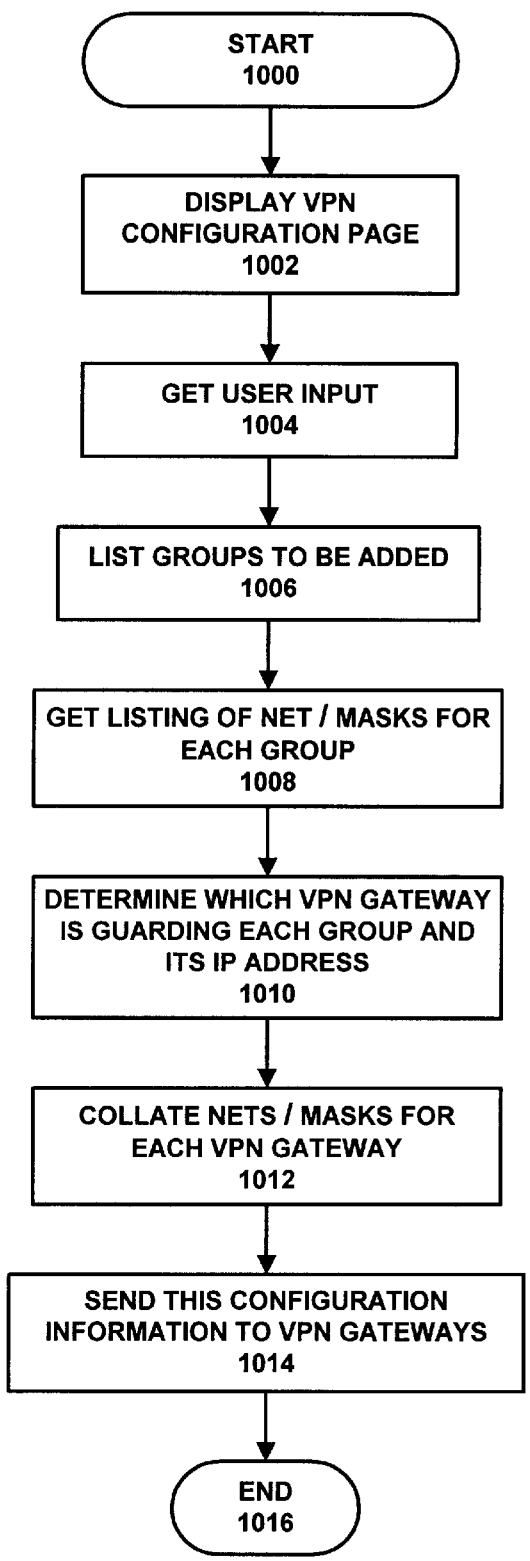
FIG. 10 is a flow chart illustrating some of the operations performed by VPN management station 160 in order to add a group to a VPN in accordance with an embodiment of the present invention.

FIG. 10 is a flow chart illustrating some of the operations performed by VPN management station 160 in order to add a group to a VPN in accordance with an embodiment of the present invention. The system starts in state 1000 and proceeds to state 1002. In state 1002, the system displays a VPN configuration page to the VPN system manager. The system then proceeds to state 1004. In state 1004, the system gets user input from the VPN system manager. The system then proceeds to state 1006. In state 1006, the system lists all groups to be added to the VPN. The system then proceeds to state 1008. In state 1008, the system gets a listing of the net/mask pairs for each group. The system then proceeds to state 1010. In state 1010, the system determines which VPN gateway is guarding each group, and the VPN gateway's IP address. The system then proceeds to state 1012. In state 1012, the system collates net/mask pairs for each gateway. The system then proceeds to state 1014. In state 1014, the system sends the configuration information to the VPN gateways across public network 100. The system then proceeds to state 1016, which is an end state.

Figure 11:
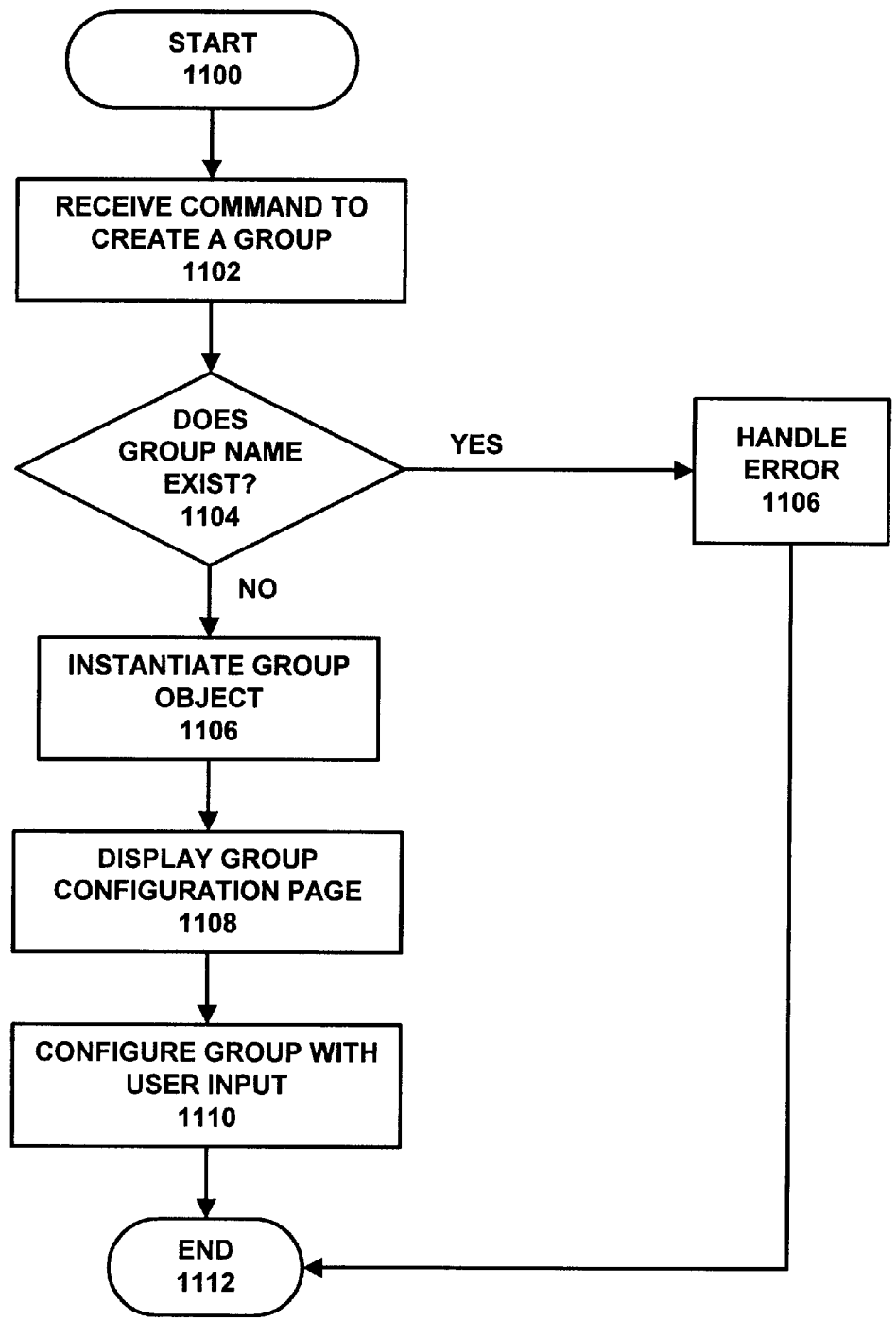
FIG. 11 is a flow chart illustrating some of the operations performed by VPN management station 160 in order to create a group in accordance with an embodiment of the present invention.

FIG. 11 is a flow chart illustrating some of the operations performed by VPN management station 160 in order to create a group in accordance with an embodiment of the present invention. The system starts in state 1100 and proceeds to state 1102. In state 1102, the system receives a command to create a group from a VPN system administrator. The system then proceeds to state 1104. In state 1104, the system determines whether or not the name of the new group already exists. If so, the system proceeds to state 1106 in which the system handles the error and then proceeds to state 1112, which is an end state. If not, the system proceeds to state 1106. In state 1106, the system instantiates a group object. The system then proceeds to state 1108. In state 1108, the system displays a group configuration page. The system then proceeds to state 1110. In state 1110, the system configures the group with user input entered into the configuration page. The system then proceeds to state 1112, which is an end state.

Description of Secure Communication of Configuration Information

Figure 12:
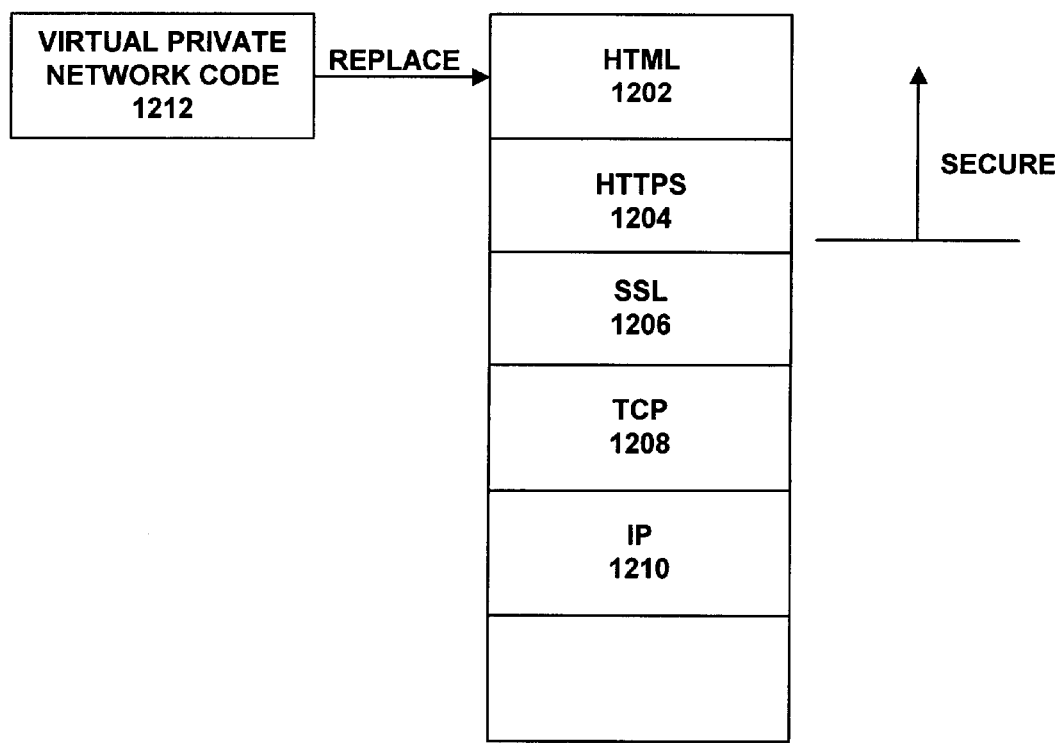
FIG. 12 is a block diagram illustrating how secure communication of configuration information is implemented in the context of system communication layers in accordance with an embodiment of the present invention.

FIG. 12 is a block diagram illustrating how secure communication of configuration information from VPN management station 160 to VPN gateways is implemented in the context of system communication layers in accordance with an embodiment of the present invention. FIG. 12 illustrates the communication layers involved in communicating with an Internet browser. One embodiment of the present invention provides security for communications between VPN management station 160 and VPN gateways by utilizing the security features that already exist in for Internet browsers. More specifically, HTML code 1202 is replaced with virtual private network code 1212. Virtual private network code 1212 is then able to communicate through the existing security mechanisms for the browser.

The existing security mechanisms are wrapped up into communication layers. More specifically, VPN code 1212 (which replaced HTML code 1202) talks to HTTPS layer 1204, which is a secure version of HTTP. HTTPS layer 1204 talks to secure sockets layer (SSL) 1206. Secure sockets layer 1206 talks to TCP layer 1208. TCP layer 1208 talks to Internet Protocol (IP) layer 1210, which sends communications across public network 100. Note that the layers above SSL 1206, namely HTTPS layer 1204 and VPN code layer 1212, are secure.

Figure 13:
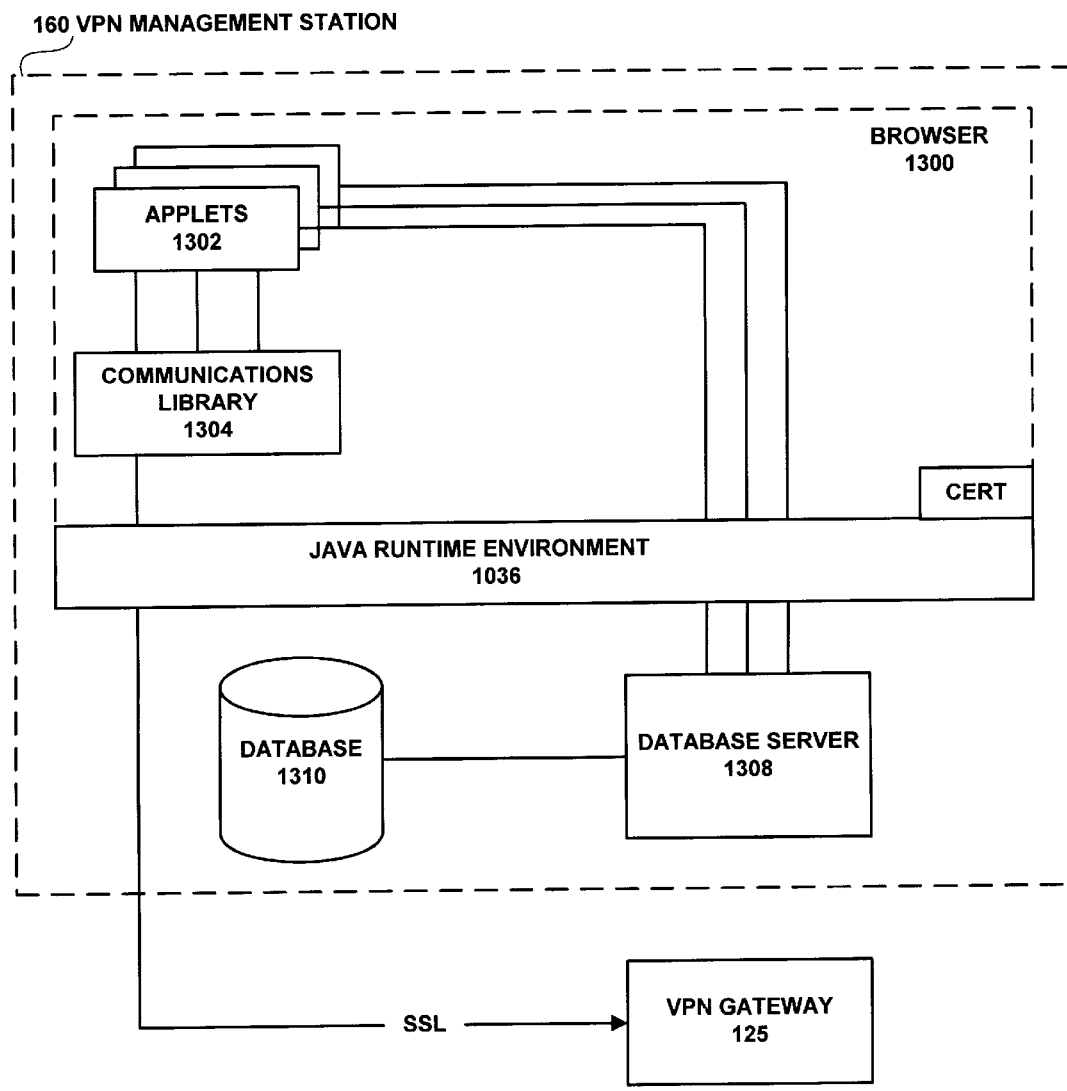
FIG. 13 is a block diagram illustrating another view of the software architecture contained within VPN management station 160 in accordance with an embodiment of the present invention.

FIG. 13 is a block diagram illustrating another view of the software architecture contained within VPN management station 160 in accordance with an embodiment of the present invention. In this embodiment, the software to manage the VPN gateways is contained within browser 1300. The main VPN logic resides within applets 1302, which communicate with communications library 1304 and database server 1308. Database server 1308 is coupled to database 1310. Communications library 1304 is itself comprised of applets, which facilitate communications to VPN gateways, such as VPN gateway 125. These communications pass through Java Runtime Environment (JRE) 1306, which implements security in the SSL layer 1206. Note that communications across public network 100 to VPN gateways present a vulnerable link because the communications take place on a physical wire that is susceptible to snooping and spoofing. To minimize these threats, one embodiment of the present invention protects data using SSL v2. There are two certificates involved in an SSL negotiation: one is embedded in network browser 1300, and the other is embedded in the VPN gateways. Each gateway has a unique certificate.

Note that communications of configuration information to VPN gateways precedes communications to database 1310 in order to ensure that the configuration information is properly committed to the VPN gateways before committing the corresponding changes to database 1310.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method for managing virtual private networks operating over a public data network, the public data network including a plurality of virtual private network gateways so that communications across virtual private networks are channeled through the virtual private network gateways, the method comprising:

receiving a command specifying an operation on a virtual private network;

wherein the command specifies the operation in terms of at least one higher-level object without specifying network addresses;

determining which virtual private network gateways are affected by the command;

translating automatically the command into configuration parameters for virtual private network gateways affected by the command, the configuration parameters specifying how the virtual private network gateways handle communications between specific groups of addresses on the public data network;

wherein translating the command involves retrieving network addresses associated with the at least one higher-level object;

wherein the configuration parameters specify lower-level network addresses; and transmitting the configuration parameters to the virtual private network gateways affected by the command.

2. The method of claim 1, further comprising the steps of:

receiving the configuration parameters at a virtual private network gateway;

receiving, at the virtual private network gateway, a communication between nodes in the public data network;

using the configuration parameters to determine whether the source and destination addresses of the communication belong to the same virtual private network; and if the source and destination addresses belong to the same virtual private network, ensuring that the communication is transmitted securely over the public data network.

3. The method of claim 1, wherein receiving the command specifying the operation on the virtual private network includes receiving the command at a virtual private network management station coupled to the public data network.

4. The method of claim 1, wherein receiving the command includes receiving a command to create a virtual private network.

5. The method of claim 1, wherein receiving the command includes receiving a command to modify a virtual private network.

6. The method of claim 1, wherein receiving the command includes receiving a command to delete a virtual private network.

7. The method of claim 1, wherein translating the command into configuration parameters includes translating the command into configuration parameters specifying Internet protocol (IP) addresses.

8. The method of claim 1, wherein translating the command into configuration parameters includes translating the command into configuration parameters that specify groups of addresses between which communications are to be transmitted securely.

9. The method of claim 1, wherein translating the command into configuration parameters includes:
aggregating address specifiers for groups of nodes involved in the command; and
creating configuration parameters by determining for each virtual private network gateway affected by the command which address specifiers specify local addresses on the local network coupled to the virtual private network gateway, and which address specifiers specify non-local addresses.

10. The method of claim 1, wherein transmitting the configuration parameters to the virtual private network gateways affected by the command includes transmitting configuration parameters securely over the public data network.

11. The method of claim 1, further comprising the step of updating a database to reflect changes on the virtual private network caused by the operation specified in the command.

12. The method of claim 1, wherein translating the command includes translating the command into configuration parameters specifying how the virtual private network gateways handle communications between specific groups of addresses, wherein at least one of the specific groups of addresses include an address of a remote client coupled to the public data network through an internet service provider (ISP).

13. A method for managing virtual private networks operating over a public data network, the public data network including a plurality of virtual private network gateways so that communications across virtual private networks are channeled through the virtual private network gateways, the method comprising:
receiving, at a virtual private network management station coupled to the public data network, a command specifying an operation on a virtual private network;
wherein the command specifies the operation in terms of at least one higher-level object without specifying network addresses;
determining which virtual private network gateways are affected by the command;
translating automatically the command into configuration parameters for virtual private network gateways affected by the command, the configuration parameters specifying groups of addresses on the public data network between which communications are to be transmitted securely;
wherein translating the command involves retrieving network addresses associated with the at least one higher-level object;
wherein the configuration parameters specify lower-level network addresses;
transmitting the configuration parameters securely to the virtual private network gateways affected by the command; and
updating a database to reflect changes on the virtual private network caused by the operation specified in the command.

14. A program storage device storing instructions that when executed by a computer perform a method for managing virtual private networks operating over a public data network, the public data network including a plurality of virtual private network gateways so that communications across virtual private networks are channeled through the virtual private network gateways, the method comprising:
receiving a command specifying an operation on a virtual private network;
wherein the command specifies the operation in terms of at least one higher-level object without specifying network addresses;
determining which virtual private network gateways are affected by the command;
translating automatically the command into configuration parameters for virtual private network gateways affected by the command, the configuration parameters specifying how the virtual private network gateways handle communications between specific groups of addresses on the public data network;
wherein translating the command involves retrieving network addresses associated with the at least one higher-level object;
wherein the configuration parameters specify lower-level network addresses; and
transmitting the configuration parameters to the virtual private network gateways affected by the command.

15. An apparatus for managing virtual private networks operating over a public data network, the public data network including a plurality of virtual private network gateways so that communications across virtual private networks are channeled through the virtual private network gateways, the apparatus comprising:
a computer system coupled to the public data network;
a user interface within the computer system for receiving a command from a user;
wherein the command specifies the operation in terms of at least one higher-level object without specifying network addresses;
a command handler in communication with the user interface for handling the command received by the user interface;
a translation module in communication with the command handler for translating the command into configuration parameters for virtual private network gateways affected by the command, the configuration parameters specifying how the virtual private network gateways handle communications between specific groups of addresses on the public data network;
wherein translating the command involves retrieving network addresses associated with the at least one higher-level object;
wherein the configuration parameters specify lower-level network addresses; and
a communication module in communication with the translation module for communicating the configuration parameters to virtual private network gateways.

16. The apparatus of claim 15, including a database in communication with the command handler for storing the state of virtual private networks managed by the apparatus.

17. The apparatus of claim 15, wherein the command includes a command to create a virtual private network.

18. The apparatus of claim 15, wherein the command includes a command to modify a virtual private network.

19. The apparatus of claim 15, wherein the command includes a command to delete a virtual private network.

20. The apparatus of claim 15, wherein the configuration parameters specify groups of addresses between which communications are to be transmitted securely.

21. The apparatus of claim 15, wherein the communication module includes resources to transmit the configuration parameters securely over the public data network.

22. The apparatus of claim 15, wherein the specific groups of addresses include an address of a remote client coupled to the public data network through an internet service provider (ISP).

* * * * *